US012647368B2

(12) United States Patent
Wei et al.

(10) Patent No.: US 12,647,368 B2
(45) Date of Patent: Jun. 2, 2026

(54) CONGESTION CONTROL FOR LOW-LATENCY INTERACTIVE VIDEO STREAMING

(71) Applicant: GOOGLE LLC, Mountain View, CA (US)

(72) Inventors: Teng Wei, Mountain View, CA (US); Connor Smith, Seattle, WA (US); David Chu, Seattle, WA (US); Devdeep Ray, Pittsburgh, PA (US); Bernhard Reinert, Seattle, WA (US); Zengbin Zhang, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 105 days.

(21) Appl. No.: 18/790,035

(22) Filed: Jul. 31, 2024

(65) Prior Publication Data

US 2025/0039099 A1 Jan. 30, 2025

Related U.S. Application Data

(63) Continuation of application No. 17/712,476, filed on Apr. 4, 2022, now abandoned.

(51) Int. Cl.
*H04L 47/2416* (2022.01)
*A63F 13/355* (2014.01)
(Continued)

(52) U.S. Cl.
CPC ........ *H04L 47/2416* (2013.01); *A63F 13/355* (2014.09); *H04L 47/12* (2013.01); *H04L 65/61* (2022.05)

(58) Field of Classification Search
CPC ..... H04L 47/2416; H04L 47/12; H04L 65/61; A63F 13/355
See application file for complete search history.

(56) References Cited

U.S. PATENT DOCUMENTS

| 10,827,181 B1 * | 11/2020 | Sen | ...................... | H04N 19/179 |
| 2004/0001691 A1 * | 1/2004 | Li | ........................... | H04L 47/36 |
| | | | | 386/200 |

(Continued)

FOREIGN PATENT DOCUMENTS

JP 2009278521 A 11/2009

OTHER PUBLICATIONS

International Preliminary Report on Patentability mailed Oct. 17, 2024 for PCT Application No. PCT/US2023/017274 8 pages.

(Continued)

*Primary Examiner* — Michael A Keller

(57) ABSTRACT

A server transmits an encoded game frame over a network to a respective client system as a set of packets. In response to transmitting the set of packets, the server determines a bandwidth estimate based on the size of the encoded game frame and the timing data associated with the transmitted set of packets. The server then compares the bandwidth estimate to a current video bitrate of the game stream being transmitted from the server to the respective client device. In response to the comparison indicating an underutilization of the network, the server increases the encoding bitrate. Further, in response to the comparison indication an overutilization of the network, the server decreases the encoding bitrate.

20 Claims, 6 Drawing Sheets

(51) Int. Cl.
    *H04L 47/12*       (2022.01)
    *H04L 65/61*       (2022.01)

(56)               References Cited

U.S. PATENT DOCUMENTS

| | | | |
|---|---|---|---|
| 2012/0257671 A1* | 10/2012 | Brockmann | H04N 21/64753 |
| | | | 375/E7.126 |
| 2017/0054648 A1* | 2/2017 | Ngo-Tan | H04L 65/752 |
| 2021/0258363 A1* | 8/2021 | Ragot | H04L 69/24 |
| 2022/0141514 A1* | 5/2022 | Cui | H04N 21/23106 |
| | | | 725/116 |
| 2022/0368765 A1* | 11/2022 | Xia | H04L 69/164 |

OTHER PUBLICATIONS

Machine Translation of Notice of Reasons for Refusal mailed Dec. 26, 2025 for JP Application No. 2024-559068, 5 pages.

* cited by examiner

CONGESTION CONTROL FOR LOW-LATENCY INTERACTIVE VIDEO STREAMING

CROSS-REFERENCE TO RELATED APPLICATIONS

The present application is a continuation application of U.S. Nonprovisional patent application Ser. No. 17/712,476, entitled "CONGESTION CONTROL FOR LOW-LATENCY INTERACTIVE VIDEO STREAMING" and filed on Apr. 4, 2022, the entirety of which is incorporated by reference herein.

BACKGROUND

Cloud-based gaming platforms execute portions of or entire video game applications on remote servers to facilitate playing the video game applications on a local client device. The remote servers provide audio and video rendered from executing video game applications as audio and video streams over a network to the local client device. In providing these audio and video streams, the remote servers employ the use of various encoder operations to compress gaming frames (that compose the rendered video) and audio in real time before they are streamed. After compressing the game frames and audio, the remote servers transmit the compressed gaming frames and audio as sets of packets over the network to the local client device.

Unlike general video streaming applications where some round-trip delay in network communication is tolerated, cloud-based gaming requires very low round-trip delays so that interactivity is maintained. Additionally, cloud-based gaming requires high and stable network throughput due to the visual artifacts that video compression techniques introduce. However, both the round-trip delay and throughput of a network can vary based on network congestion. Accordingly, to address these requirements, some cloud-based gaming platforms implement congestion control algorithms that adjust a pacing rate to compensate for congestion on the network. However, such congestion control algorithms do not help ensure low latency and high bandwidth of game streams under a diverse range of dynamic network conditions such as noisy links and queue-building cross traffic. Further, any mismatch between these congestion control algorithms' transmission rates and the encoded video bitrate of a game stream will introduce sender-side queuing, wherein data is queued at the remote server, thus adversely affecting the end-to-end frame delay and user experience.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Techniques and systems described herein address alleviating congestion on a network by modifying an encoding bitrate of one or more encoders. In particular, such techniques and systems described herein allow for a server to modify an encoding bitrate based on an estimated bandwidth of an encoded game frame transmitted by the server to a respective client system. To this end, a server first transmits an encoded game frame over a network to a respective client system. In response to transmitting the encoded game frame, the server determines a bandwidth estimate for the transmitted encoded game frames based on the size of the encoded game frame and the timing data associated with the transmission of the encoded game frame from the server to the respective client device. The server then compares the bandwidth estimate to a current video bitrate (e.g., average bitrate) of the game stream being transmitted from the server to the respective client device. In response to the comparison indicating underutilization of the network (e.g., less than the entire available bandwidth of the network is utilized), the server increases the encoding bitrate so that the game stream better utilizes the available bandwidth of the network. Further, in response to the comparison indicating overutilization of the network (e.g., more than the entire available bandwidth of the network is utilized), the server decreases the encoding bitrate so that the game stream utilizes less bandwidth of the network and any bottleneck queues at the server are drained, helping to alleviate congestion on the network.

To facilitate understanding, the techniques of the present disclosure are described in the example context of a cloud gaming system. A cloud-based or other remote server renders a stream of video frames representing the visual content of a video game instance being executed at that server or a related server and then encodes each frame using a multi-try encoding process described herein to generate a bitstream representing a stream of encoded rendered game frames for transmission to one or more client devices via one or more networks. However, it will be appreciated that the systems and techniques described herein are not limited to this example context, but instead may be implemented in any of a variety of video stream encoding/decoding systems using the guidelines provided herein.

Figure 1:
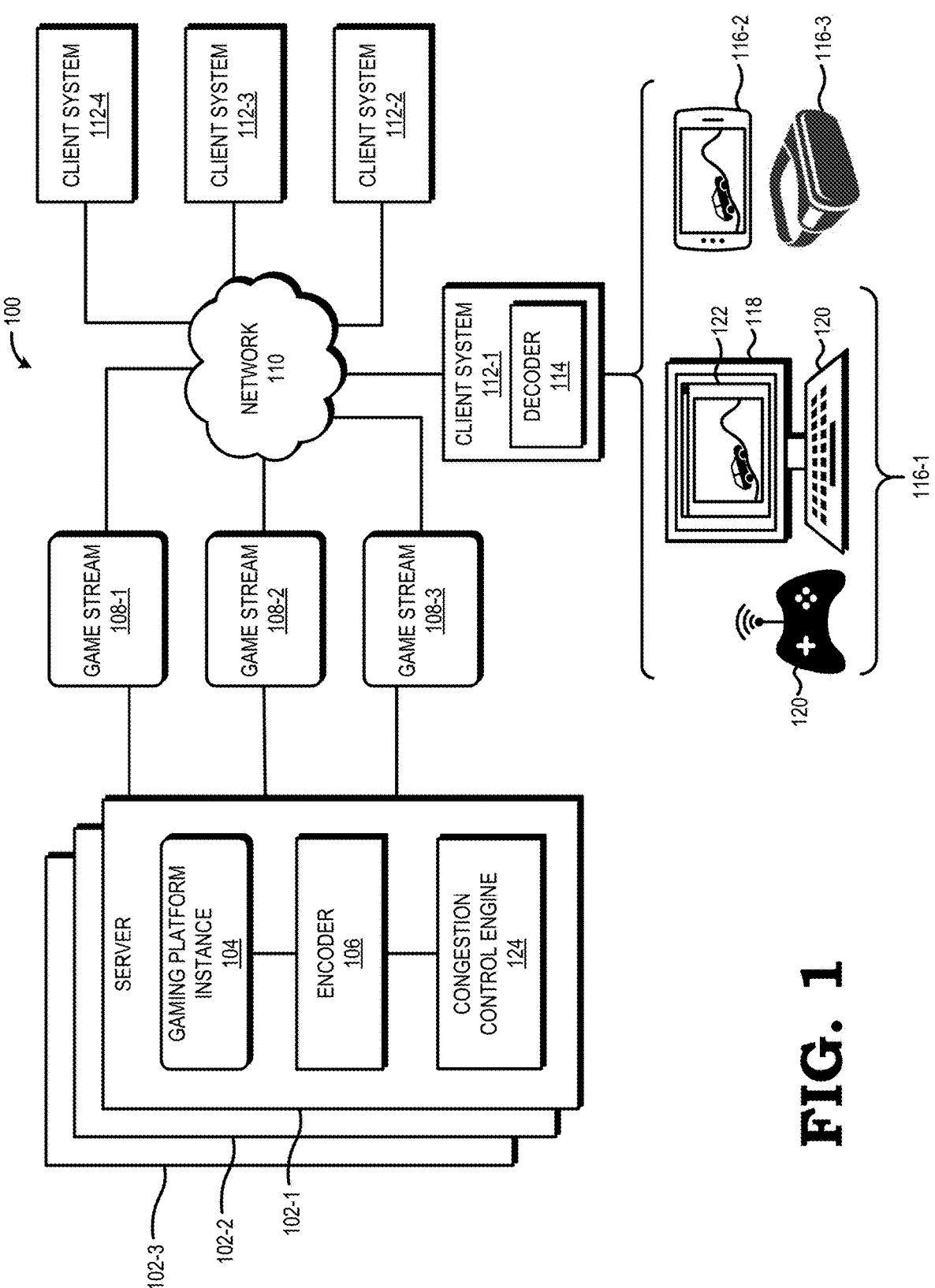
FIG. 1 is a block diagram of a cloud-based gaming system for single-player or multiplayer (including massively multiplayer) gaming, according to some embodiments.

FIG. 1 illustrates a cloud-based gaming system 100 for single-player or multiplayer (including massively multiplayer) gaming, according to some embodiments. Cloud-based gaming system 100 includes one or more servers 102, with each server 102 communicatively coupled to one or more client systems 112 by at least one network 110. Network 110 is configured to allow for the transmission and reception of data between any of servers 102 and client systems 112 and includes, for example, wired and wireless networks, such as Ethernet, the Internet, Wi-Fi, or any combination thereof. In embodiments, each server 102 is communicatively interconnected via a high-bandwidth, low-latency inter-server messaging bus. Servers 102 are typically distributed in one or more data centers over a geographical area so as to reduce transmission latency through physical proximity. Though in the illustrated embodiment, three servers 102-1, 102-2, and 102-3 are presented supporting four client systems 112-1, 112-2, 112-3, and 112-4, in other embodiments, any number of servers may be implemented supporting any number of client devices. It will be appreciated that in a typical real-world implementation, the quantity of servers 102 and quantity of client systems 112 typically will be considerably higher than presented in the example of FIG. 1.

In the depicted embodiment, each server 102 includes a computing device, for example, a cloud server, virtual server, or any combination thereof configured to support one or more client gaming sessions executed on one or more client systems 112. A "client gaming session", as used herein, includes a gaming application being played, partially simulated, or fully simulated on client system 112. Each server 102 is configured to support this client gaming session by executing a corresponding game platform instance 104 that facilitates the execution of at least a portion of the gaming application being played, partially simulated, or fully simulated on the client system 112. Such facilitation can include performing one or more operations related to the gaming application, for example, rendering one or more frames related to the gaming application, performing calculations related to the gaming application (e.g., lighting calculations, artificial intelligence calculation, physics calculations, shading calculations, input calculations, and the like), providing access to files, or any combination thereof, to name a few. The game platform instance 104 provides various software and hardware resources to achieve such facilitation, such as communication/network management, resource management, media rendering encoding, and the like. In this way, game platform instance 104 simulates the execution of one or more operations of the gaming application for a corresponding player as though that gaming application was being played on a local gaming device, such as a personal computer ("PC"), game console, smartphone, tablet computer, automotive entertainment system, and the like.

Each client system 112 represents the hardware and software resources utilized to receive player input through manipulation of one or more input/output devices for at least one player, as well as to present the video and audio content representing the visual and auditory content, respectively, of the gameplay for the at least one player. Examples of a client system 112 include one or more desktop computers, notebook computers, tablet computers, virtual-reality systems, augmented reality systems, a compute-enabled cellular phone (i.e., a "smartphone"), a compute-enabled television (i.e., a "smart TV"), or any combination thereof, to name a few. As illustrated with reference to client system 112-1, each client system 112 includes one or more client devices 116. In the illustrated embodiment, client system 112-1 comprises a first client device 116-1, which is communicatively coupled to, or otherwise associated with, display 118, at least one input device 120 (e.g., a gamepad, joystick, keyboard, mouse, touchscreen), one or more network interfaces configured to couple to the network connecting the client system 112 to a corresponding server 102, one or more processors, memory, storage, speakers, and other computing resources to render, process, and display scenes of a virtual environment. As illustrated with reference to client system 112-1, each client system 112 can include a decoder 114 configured to decode one or more frames related to a virtual environment. Decoder 114 can include hardware and software configured to decode one or more encoding streams (e.g., game streams 108) received from servers 102 so as to produce a decoded set of frames or decoded stream. Each decoder 114 is configured to decode any encoded frame encoded by any method or process disclosed herein. In embodiments, client system 112-1 further comprises a smartphone client device 116-2, and a wearable virtual reality client device 116-3, each of which may operate as an integrated mobile computing device having input facilities, output facilities, display facilities, and communication facilities analogous to those noted above with respect to client system 112-1. In certain embodiments, client systems 112-1, 112-2, and 112-3 may include one or more facilities such as accelerometers, Global Positioning System (GPS) devices, and the like that are used to acquire motion data representing a movement of the client device, as well as a rate or acceleration of such movement.

While certain aspects described herein will be discussed with specific reference to cloud gaming scenarios, it will be appreciated that in certain embodiments the described techniques may be utilized in various non-gaming scenarios, such as if one or more of servers 102 and client systems 112 operate to render, process, and display other types of informational, educational, recreational and/or artistic content. It will therefore be further appreciated that while techniques are discussed herein with respect to the rendering of content that may utilize particular examples relevant to cloud gaming and gaming content, such discussions and techniques may be applied to such non-gaming scenarios. Examples provided herein may refer to scenarios involving the rendering, processing, and display of gaming content due to particular bandwidth and network latency issues relevant to such content and should not be construed to indicate that the techniques described are limited to those scenarios.

During operation, each server 102 executes a gaming platform instance 104 for one or more client gaming sessions. Executing game platform instance 104 includes rendering a set of gaming frames that includes one or more gaming frames associated with the gaming application being executed on one or more respective client systems 112. Each rendered gaming frame depicts at least a portion of a virtual environment used in the gaming application executed on the client system 112. For example, each rendered gaming frame can depict at least a portion of a virtual environment displayed on a display 118 of a client system 112 during the client gaming session.

Each server 102 is configured to encode each rendered gaming frame via a respective encoder 106 so as to generate a respective encoded set of frames (also referred to herein as "game stream" 108). Each server 102 is configured to encode a game stream 108 through, for example, compression, reorganization, and manipulation of each frame rendered by gaming platform instance 104. In embodiments, an encoder 106 of a server 102 implements one or more codecs so as to encode one or more rendered frames according to the one or more codecs. Such codecs can include H.264, H.265, VP9, AV1, or any combination thereof, to name a few. Each resulting game stream 108 corresponds to a gaming application being executed on one or more client systems 112 and is provided to these corresponding client systems 112 via network 110. The corresponding client systems 112 are each configured to decode a received game stream 108 via a decoder 114 and display the resulting decoded set of frames 122 on, for example, a display 118. Each client system 112 is configured to decode a respective game stream 108 by compression, reorganization, and manipulation of the frames within the encoded stream according to one or more various video codecs including lossless and lossy codecs. According to embodiments, each client system 112 includes a decoder that implements one or more codecs so as to decode a received game stream 108 according to the one or more codecs. Such codecs can include H.264, H.265, VP9, AV1, or any combination thereof, to name a few. Though three game streams 108-1, 108-2, 108-3 are depicted in the illustrated embodiment, in other embodiments, servers 102 can generate any number of game streams 108 each corresponding to one or more client gaming sessions.

In embodiments, each server 102 is configured to transmit each encoded game frame of a game stream 108 to respective client systems 112 as a set of packets. That is to say, each server 102 transmits a set of packets representing an encoded game frame to a respective client system 112. To help alleviate congestion on the network 110 due to the game streams 108 (e.g., the sets of packets representing the encoded game frames) being sent from one or more servers 102 to corresponding client systems 112, each server 102 includes a respective congestion control engine 124 that includes hardware and software configured to modify an encoder bitrate of a respective encoder 106 in response to underutilization of the network 110, overutilization of the network 110, or both by game stream 108. For example, in response to underutilization of the network 110 (e.g., less than a predetermined threshold amount of bandwidth of the network 110 is utilized), a congestion control engine 124 increases the encoder bitrate of a respective encoder 106. As another example, in response to overutilization of the network 110 (e.g., more than a predetermined threshold amount of bandwidth of the network 110 is utilized), a congestion control engine 124 decreases the encoder bitrate of a respective encoder 106. In this way, the congestion control engine 124 lowers an encoding bitrate of a respective encoder 106 in response to congestion on the network 110 (e.g., overutilization of the network 110). Lowering the encoding bitrates in this way aids in draining any bottleneck queues caused by previously encoded frames and reduces the bandwidth of a game stream 108, helping to alleviate congestion on the network 110. To determine an underutilization of the network 110, overutilization of the network 110, or both by game stream 108, each congestion control engine 124 is configured to determine a bandwidth estimate of network 110 (e.g., an estimate of the amount of the bandwidth currently available on the network 110).

To determine a bandwidth estimate, a congestion control engine 124 first determines a bandwidth sample of network 110 (e.g., a sample of the amount of the available bandwidth of network 110), based on, for example, interval data associated with the transmission of an encoded game frame. The interval data includes, for example, data representing the time interval for which an encoded game frame was transmitted from a server 102 and completely received at respective client system 112. As an example, the interval data includes a size of the encoded frame and the time elapsed from transmitting the encoded game frame from a server 102 to when the encoded game frame was completely received by a respective client system 112 (e.g., the time elapsed from when a first transmitted packet associated with the encoded game frame was transmitted by a server to when the last transmitted packet associated with the encoded game frame was received by a respective client system 112). In embodiments, a congestion control engine 124 determines a bandwidth sample from the interval data by, for example, dividing the frame size of the encoded frame by the time elapsed from transmitting the encoded game frame from a server 102 to when the encoded game frame was completely received by a respective client system 112. According to embodiments, after determining the bandwidth sample, the congestion control engine 124 smooths the bandwidth sample based on one or more previous bandwidth estimates to produce an updated bandwidth estimate. For example, the congestion control engine 124 uses the bandwidth sample to update a current bandwidth estimate (e.g., a predetermined default bandwidth estimate or a previously determined bandwidth estimate) to produce an updated bandwidth estimate. In some embodiments, the bandwidth estimate determined by a congestion control engine 124 includes a bandwidth sample, while in other embodiments, the bandwidth estimate determined by a congestion control engine includes the updated bandwidth estimate (e.g., a smoothed bandwidth sample). In response to determining a bandwidth estimate (e.g., bandwidth sample, updated bandwidth estimate), the congestion control engine 124 is configured to determine an underutilization of the network 110, overutilization of the network 110, or both, by, for example, comparing the bandwidth estimate to a current video bitrate representing the average bitrate at which game stream 108 is transmitted from a server 102 to a respective client system 112. As an example, in response to the bandwidth estimate being less than the current video bitrate, a congestion control engine 124 determines an overutilization of the network as the current video bitrate of game stream 108 exceeds the estimated available bandwidth of network 110. Similarly, for example, in response to the bandwidth estimate being greater than the current video bitrate, a congestion control engine 124 determines an underutilization of the network as the current video bitrate of game stream 108 falls below a predetermined threshold utilization of the estimated available bandwidth of network 110.

In embodiments, each congestion control engine 124 is also configured to set a pacing rate for one or more encoded game frames of a game stream 108. The pacing rate includes, for example, a value indicating a maximum bandwidth for sending packets related to a respective encoded game frame over network 110 (e.g., a value indicating the rate at which to send a set of packets related to an encoded game frame). That is to say, each congestion control engine 124 sets the pacing rate for packets of a game stream 108 sent from a server 102 to a corresponding client system 112. According to embodiments, each congestion control engine 124 is configured to set a pacing rate for a respective encoder 106 based on, for example, a determined bandwidth estimate (e.g., bandwidth sample, updated bandwidth estimate) based on the transmission of an encoded game frame transmitted from server 102 to a respective client system 112. For example, a congestion control engine 124 is configured to set a pacing rate as a multiple of a bandwidth estimate. In this way, the congestion control engines 124 help alleviate congestion of the network 110 due to pacing rates without underutilizing the network 110.

Figure 2:
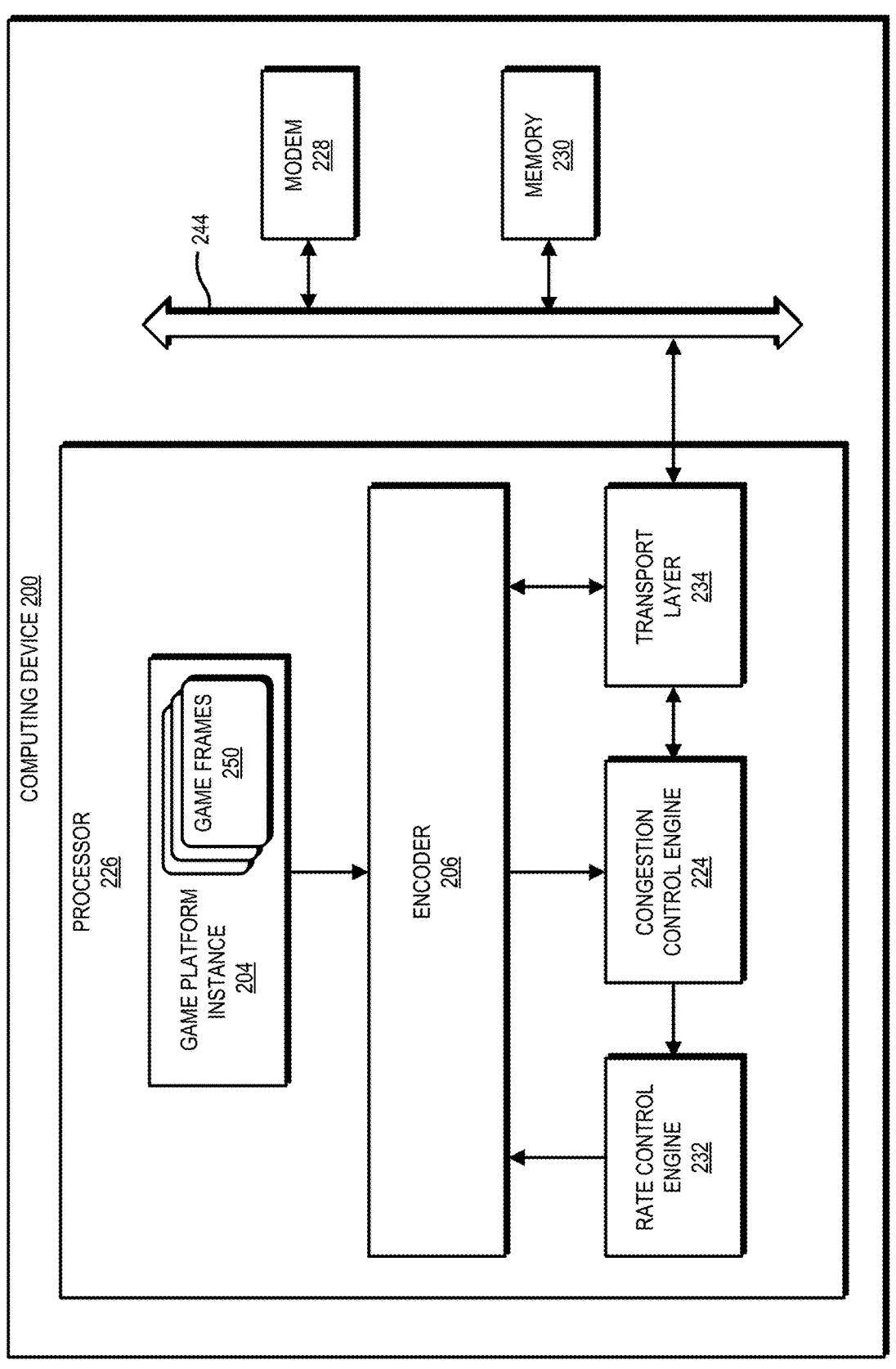
FIG. 2 is a block diagram of a computing device configured to encode and stream frames within a cloud-based gaming system, according to some embodiments.

Referring now to FIG. 2, a computing device 200 configured to encode and stream frames within a cloud-based gaming system is illustrated. In embodiments, computing device 200 implements aspects of cloud-based gaming system 100 as described in FIG. 1. For example, computing device 200 may be similar or the same as server 102 described in FIG. 1. Computing device 200 includes one or more software and hardware components for bi-directional communications including components for encoding a set of game frames 250 such as to produce a game stream 108. In some embodiments, computing device 200 is part of an electronic device that supports encoding of a set game frames 250, including, for example, a desktop computer, a notebook computer, a tablet, a server, or a game console, to name a few. In embodiments, computing device 200 includes processor 226, modem 228, and memory 230. Memory 230 includes an electronic storage device, such as for example, a solid-state drive, a hard disk drive, random access memory ("RAM"), read-only memory ("ROM"), electronically erasable programmable ROM ("EEPROM"), optical storage device, or any combination thereof. Memory 230 includes instructions and data related to the operation of game platform instance 204, encoders 206, congestion control engine 224, rate control engine 232, and transport layer 234, for example, codecs, reference frames, gaming engines, gaming applications, constants, and the like. Modem 228 is configured to be communicatively coupled to one or more client systems 112 via a network 110 and further configured to transmit a game stream 108 to the one or more client systems 112 using the network 110. According to embodiments, processor 226, modem 228, and memory 230 are internally in electronic communication via one or more interfaces (e.g., a bus 244).

According to embodiments, processor 226 includes one or more control processing units ("CPUs"), microprocessors, field-programmable gate arrays ("FPGAs"), graphics processing units ("GPUs"), application specific integrated circuits (ASICs), or any combination thereof and is configured to render and encode gaming frames for use in a client gaming session on cloud-based gaming system 100. Processor 226 operates to execute a game platform instance 204, the same or similar as game platform instance 104, associated with a current client gaming session and configured to support a gaming application executed on one or more client systems 112. Game platform instance 204 includes graphics hardware and software (not shown for clarity) to render a set of game frames 250 associated with an environment of the gaming application executed on the one or more client devices. Such graphics hardware and software include, for example, graphics cores, processing cores, pixel shaders, video random access memory ("VRAM"), GPUs, physics engines, lighting engines, tessellation engines, and the like. Each rendered game frame of the set of game frames 250 represents at least a portion of a virtual environment associated with the gaming application executed on the client device. For example, if the gaming application is a racing game, each game frame of the set of game frames 250 represents at least a portion of a racetrack, car, or surrounding area.

Each rendered game frame of the set of game frames 250 is provided to encoder 206 for encoding into a game stream 108. Encoder 206 includes hardware and software configured to encode one more game frames 250 so as to produce game stream 108 according to, for example, interframe and intraframe techniques. To reduce the bandwidth needed to transmit a game stream 108 between computing device 200 and one or more client systems 112, encoder 206 encodes game stream 108 by compressing one or more game frames 250 of the set of game frames 250. Compressing a game frame includes comparing the game frame to one or more reference frames stored in memory 230 and encoding one or more of the differences between the game frame and the one or more reference frames into game stream 108. Encoder 206 is further configured to encode the reference frames used into game stream 108. According to embodiments, in response to encoder 206 encoding a game frame so as to produce an encoded game frame, encoder 206 is configured to provide the encoded game frame to transport layer 234 for transmission to one or more client systems 112. Transport layer 234 includes hardware and software configured to packetize and transmit one or more encoded game frames to one or more client systems 112 over the network 110. For example, transport layer 234 is configured to generate a set of packets representing an encoded game frame and transmit the set of packets to a client system 112. In embodiments, in response to packetizing and transmitting an encoded game frame to a client system 112, transport layer 234 is configured to generate a set of transmit timestamps that include, for example, data indicating the time (e.g., year, month, week, day, hour, minute, second, millisecond, or any combination thereof) each packet of a set of packets generated from an encoded game frame was transmitted by transport layer 234. Further, transport layer 234 is configured to receive a set of receive timestamps from one or more client systems 112 in response to transmitting a set of packets to the client systems 112. The set of receive timestamps include data indicating the time (e.g., year, month, week, day, hour, minute, second, millisecond, or any combination thereof) each packet of a set of packets generated from an encoded game frame was received by a respective client system 112 from transport layer 234. That is to say, in response to receiving a packet of a set of packets transmitted by transport layer 234, a respective client device 112 is configured to transmit an acknowledgement to transport layer 234 that includes a timestamp indicating the pack was received by the respective client system 112.

To help alleviate congestion on the network 110 caused by a game stream 108, processor 226 includes congestion control engine 224 configured to help reduce congestion on the network 110 by modifying an encoding bitrate used by encoder 106 to encode game frames 250. In embodiments, congestion control engine 224 is configured to determine a bandwidth sample of the network 110 (e.g., the amount of available bandwidth on network 110) based on the encoded frame being transmitted from transport layer 234 to a respective client system 112. The bandwidth sample represents, for example, an amount of available bandwidth of network 110 based on the end-to-end transport of an encoded game frame from a transport layer 234 to a respective client system 112. To determine a bandwidth sample, congestion control engine 224 uses timing data and frame information related to the transmitted encoded game frame. Such timing data includes, for example, the set of transmit timestamps generated by transport layer 234 in response to transmitting the set of packets of an encoded game frame to a respective client system 112 and the set of receive timestamps received by transport layer 234 in response to the set packets of the encoded game frame being received by the respective client system 112. Additionally, such frame data includes, for example, the size (e.g., in bits) of the encoded game frame. Based on the timing data and frame data associated with a transmitted encoded game frame, congestion control engine 224 is configured to determine a bandwidth sample, for example, according to the following equation:

$$S = \frac{F}{R_{end} - S_{start-\Delta min}} \qquad \text{[EQ1]}$$

Wherein S represents the bandwidth sample (e.g., in bits per second), F represents the frame size (e.g., in bits) of the transmitted encoded frame, $R_{end}$ represents the last (e.g., latest) received timestamp of the set of receive timestamps received from a client system 112, $S_{start}$ represents the first (e.g., earliest) timestamp of the set of transmit time stamps, and $\Delta_{min}$ represents the minimum observed delta between a transmit timestamp and a receive timestamp for a packet associated with a previously transmitted encoded game frame. That is to say, the minimum observed delta between a packet's send and receive timestamp for packets associated with a previously encoded game frame transmitted during a past time window.

In embodiments, congestion control engine 224 is further configured to account for an undershoot (e.g., a game stream 108 not utilizing all the available bandwidth on the network 110) in determining a bandwidth sample. Such undershoots arise, for example, due to conservative rate control mechanisms (e.g., implemented by rate control engine 232) that serve as a bridge between a bandwidth sample and the encoder bitrate to reduce the frequency of encoder bitrate updates, due to application-specific maximum encoder bitrate settings, due to encoder undershoot when the video data is not complex enough to warrant encoding frames at the full requested target bitrate (e.g., low-motion scenes), or any combination thereof. To account for an undershoot, congestion control engine 224 is configured to determine a bandwidth sample, for example, according to the following equation:

$$S = \frac{F * \gamma}{R_{end} - S_{start} - \Delta_{min+}(R_{end} - R_{start}) * (\gamma - 1)} \quad \text{[EQ2]}$$

Wherein $\gamma$ represents an undershoot correction factor. In embodiments, congestion control engine 224 is configured to determine the undershoot correction factor based on a predetermined maximum frame size. Such a predetermined maximum frame size represents, for example, the size of a transmitted encoded frame without undershoot. According to embodiments, congestion control engine 224 is configured to determine the undershoot correction factor, for example, according to the following equation:

$$\gamma = \frac{F_{max}}{F} \quad \text{[EQ3]}$$

Wherein $F_{max}$ represents the predetermined maximum frame size and F represents the actual frame size of the transmitted encoded frame.

In embodiments, congestion control engine 224 is configured to smooth the bandwidth sample, for example, by using the bandwidth sample to determine an updated bandwidth estimate. For example, based on the bandwidth sample (e.g., S), congestion control engine 224 is configured to update a current bandwidth estimate for a game stream 108 being transmitted by transport layer 234. The current bandwidth estimate includes, for example, a predetermined default bandwidth estimate or a previously determined bandwidth estimate associated with processing device 200. According to embodiments, congestion control engine 224 is configured to update a current bandwidth estimate, for example, according to the following equation:

$$B' = B + \delta\left(r\left(\frac{S}{B} - 1\right) - \left(\frac{B}{S} - 1\right)\right) \quad \text{[EQ4]}$$

Wherein B' represents the updated bandwidth estimate, B represents the current bandwidth estimate, $\delta$ represents the predetermined step size of congestion control engine 224, and r represents a predetermined reward weight for bandwidth utilization. The predetermined step size of congestion control engine 224 represents, for example, a trade-off between the smoothness of the bandwidth sample and the convergence time under dynamic network conditions and includes, in an example embodiment, a value of 320 kbps. The predetermined reward weight for bandwidth utilization includes, in an example embodiment, a value of 0.25.

According to embodiments, congestion control engine 224 is configured to provide the bandwidth sample, updated bandwidth estimate, or both to rate control engine 232 that includes hardware and software configured to determine, set, and modify the encoding bitrate of encoder 206. In some embodiments, rate control engine 232 is included in congestion control engine 224 while in other embodiments rate control engine 224 is distinct from congestion control engine 224. According to embodiments, rate control engine 232 is configured to modify the encoding bitrate of encoder 206 based on a comparison of a bandwidth sample, an updated bandwidth estimate, or both to a current video bitrate of a game stream 108. The current video bitrate, for example, represents an average bitrate at which a game stream 108 associated with a bandwidth sample, an updated bandwidth estimate, or both is transmitted by transport layer 234 to a respective client system 112. In embodiments, congestion control engine 224, rate control engine 232, or both are configured to determine a current video bitrate, for example, according to the following equation:

$$V = \frac{F}{I} \quad \text{[EQ5]}$$

Wherein V represents the current video bitrate, F represents an average frame size of game stream 108, and I represents the average frame interval (e.g., in milliseconds) of game stream 108. In response to the comparison of a bandwidth sample, an updated bandwidth estimate, or both to the current video bandwidth indicating underutilization of network 110, rate control engine 232 is configured to increase the encoding bitrate of encoder 206. For example, in response to a bandwidth sample, updated bandwidth estimate, or both being greater than the current video bitrate (e.g., indicating the game stream 108 is not utilizing a predetermined threshold amount of the available bandwidth of the network 110), rate control engine 232 is configured to increase the encoding bitrate of encoder 206. Increasing the encoding bitrate of encoder 206 in this way helps aid in increasing the utilization of the network 110 without creating additional queueing of encoded frames. Additionally, in response to the comparison of the bandwidth sample, an updated bandwidth estimate, or both to the current video bitrate indicating overutilization of the network 110, rate control engine 232 is configured to decrease the encoding bitrate of encoder 206. For example, in response to a bandwidth sample, an updated bandwidth estimate, or both being less than the current video bitrate (e.g., indicating the game stream 108 is utilizing more than the available bandwidth of the network 110), rate control engine 232 is configured to increase the encoding bitrate of encoder 206. Lowering the encoding bitrate in this way aids in draining any bottleneck queues caused by previously encoded frames and aids in alleviating congestion on the network 110 by reducing the bandwidth of a game stream 108.

According to embodiments, congestion control engine 224 is further configured to determine a pacing rate for packets transmitted by transport layer 234. That is to say, congestion control engine 224 determines the rate at which the set of packets for an encoded game frame is transmitted from transport layer 234 to a respective client system 112. Congestion control engine 224 is configured to determine a pacing rate, for example, based on a determined updated bandwidth estimate. As an example, congestion control engine 224 is configured to set the pacing rate as a multiple of a determined updated bandwidth estimate. Setting the pacing rate in this way allows other flows to disperse the packets within an encoded game frame sent by transport layer 234 while increasing the utilization rate of the network 110.

Figure 3:
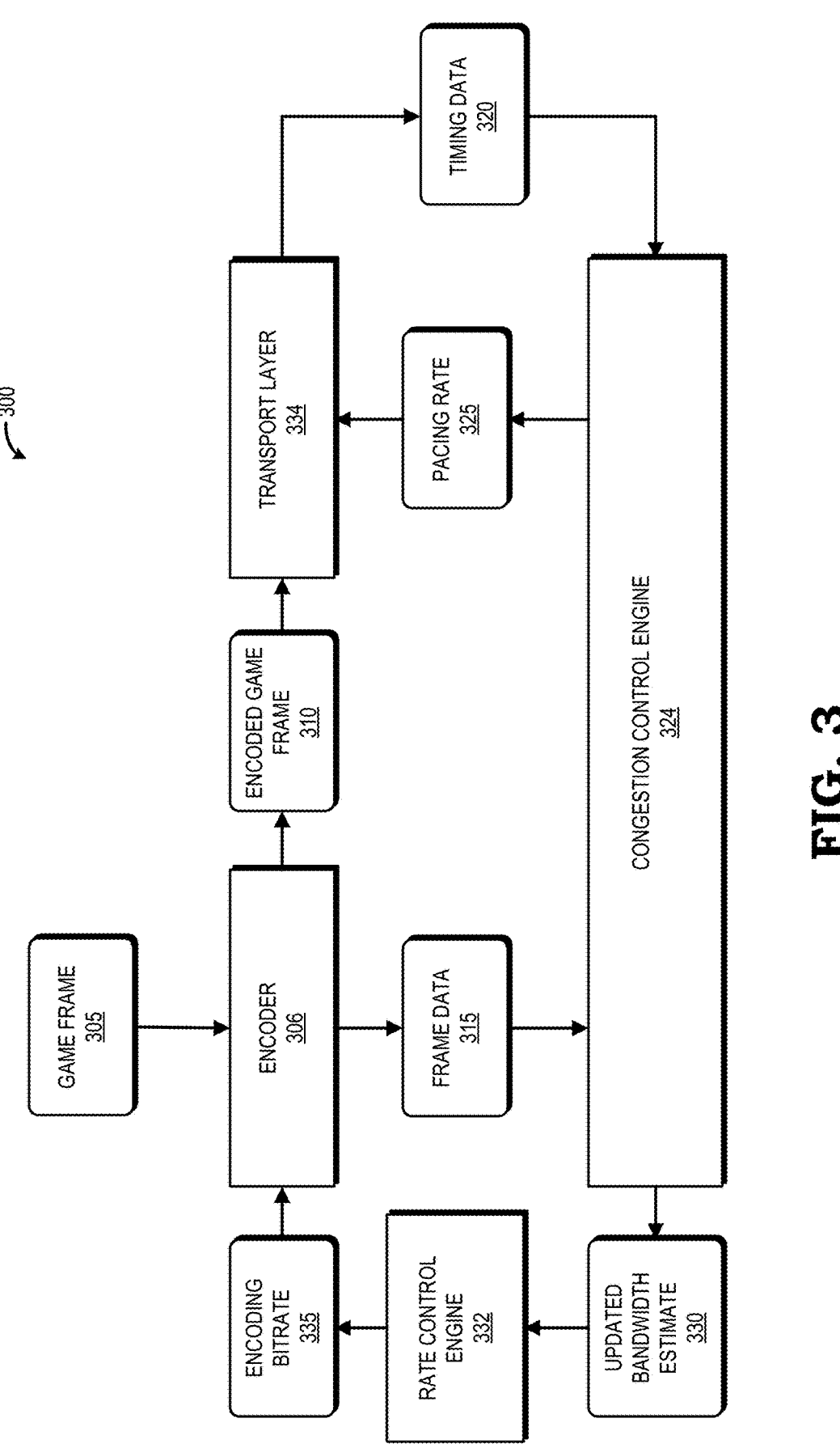
FIG. 3 is a flow diagram of an example operation for modifying an encoding bitrate to alleviate network congestion, according to an example embodiment.

Referring now to FIG. 3, an example operation 300 for modifying an encoding bitrate to alleviate network congestion is presented. The operation 300 includes an encoder 306, similar to or the same as encoder 106, 206, receiving a game frame 305 from, for example, set of game frames 250. In response to receiving the game frame 305, encoder 306 encodes the game frame 305 so as to produce an encoded game frame 310. Additionally, encoder 306 generates frame data 315 related to encoded game frame 310 that includes, for example, the size of encoded game frame 310. After encoding game frame 305, encoder 306 provides encoded game frame 310 to transport layer 334 and frame data 315 to congestion control engine 324. The operation 300 further includes transport layer 334, similar to or the same as transport layer 234, transmitting encoded game frame 310 as a set of packets to a respective client system 112. In response to transmitting encoded game frame 310 as a set of packets, transport layer 334 generates a set of transmit timestamps wherein each transmit timestamp in the set of transmit timestamps represents a time (e.g., year, month, week, day, hour, minute, second, millisecond) that a respective packet of the set of packets was transmitted by transport layer 334 to a respective client system 112. Additionally, in response to transmitting encoded game frame 310 as a set of packets, transport layer 334 receives a set of receive timestamps from the respective client system 112. Each receive timestamp in the set of receive timestamps represents a time (e.g., year, month, week, day, hour, minute, second, millisecond) that a respective packet of the set of packets was received by a respective client system 112 from transport layer 334.

In embodiments, the operation 300 includes transport layer 334 providing timing data 320 to congestion control engine 324, similar to or the same as congestion control engine 124, 224. Timing data 320 includes, for example, the set of transmit timestamps and the set of receive timestamps associated with the transmission of encoded game frame 310. In response to receiving the timing data 320, congestion control engine 324 determines updated bandwidth estimate 330 (e.g., the amount of available bandwidth of network 110). To determine updated bandwidth estimate 330, congestion control engine 324 determines a bandwidth sample based on frame data 315, timing data 320, or both, according to any equation disclosed herein. After determining the bandwidth sample, congestion control engine 324 updates a current bandwidth estimate (e.g., predetermined default bandwidth estimate, previously determined bandwidth estimate) based on the bandwidth sample so as to produce updated bandwidth estimate 330. For example, congestion control engine 324 updates a current bandwidth estimate based on a determined bandwidth sample and according to any equation disclosed herein so as to produce updated bandwidth estimate 330.

The operation 300 further includes congestion control engine 324 providing the updated bandwidth estimate 330 to rate control engine 332, similar to or the same as rate control engine 232. In response to receiving updated bandwidth estimate 330, rate control engine 332 compares updated bandwidth estimate 330 to a current video bitrate representing, for example, the average rate at which a game stream 108 associated with updated bandwidth estimate 330 is transmitted by transport layer 334 to a respective client system 112. Based on the comparison of updated bandwidth estimate 330 to the current video bitrate, rate control engine 332 is configured to modify the encoding bitrate of encoder 306 so as to produce encoding bitrate 335. For example, in response to updated bandwidth estimate 330 being greater than the current video bitrate (e.g., indicating underutilization of network 110) rate control engine 332 is configured to increase the encoding bitrate of encoder 206 to produce encoding bitrate 335. As another example, in response to updated bandwidth estimate 330 being less than the current video bitrate (e.g., indicating overutilization of network 110), rate control engine 332 is configured to decrease the encoding bitrate of encoder 206 to produce encoding bitrate 335. Modifying the bitrate of encoder 306 in this way helps alleviate congestion on the network 110 transmitting a game stream 108 while also helping to prevent underutilization of network 110. After producing encoding bitrate 335, rate control engine 332 provides encoding bitrate 335 to encoder 306.

In embodiments, the operation 300 further includes congestion control engine 324 determining pacing rate 325 based on updated bandwidth estimate 330. Pacing rate 325 represents, for example, the rate at which a set of packets for an encoded game frame are transmitted from transport layer 334 to a respective client system 112. According to embodiments, congestion control engine 324 determines pacing rate 325 as a multiple of updated bandwidth estimate 330. That is to say, congestion control engine 324 multiplies updated bandwidth estimate 330 by a predetermined constant value (e.g., 2) to determine pacing rate 325. After determining pacing rate 325, congestion control engine 324 provides pacing rate 325 to transport layer 334.

Figure 4:
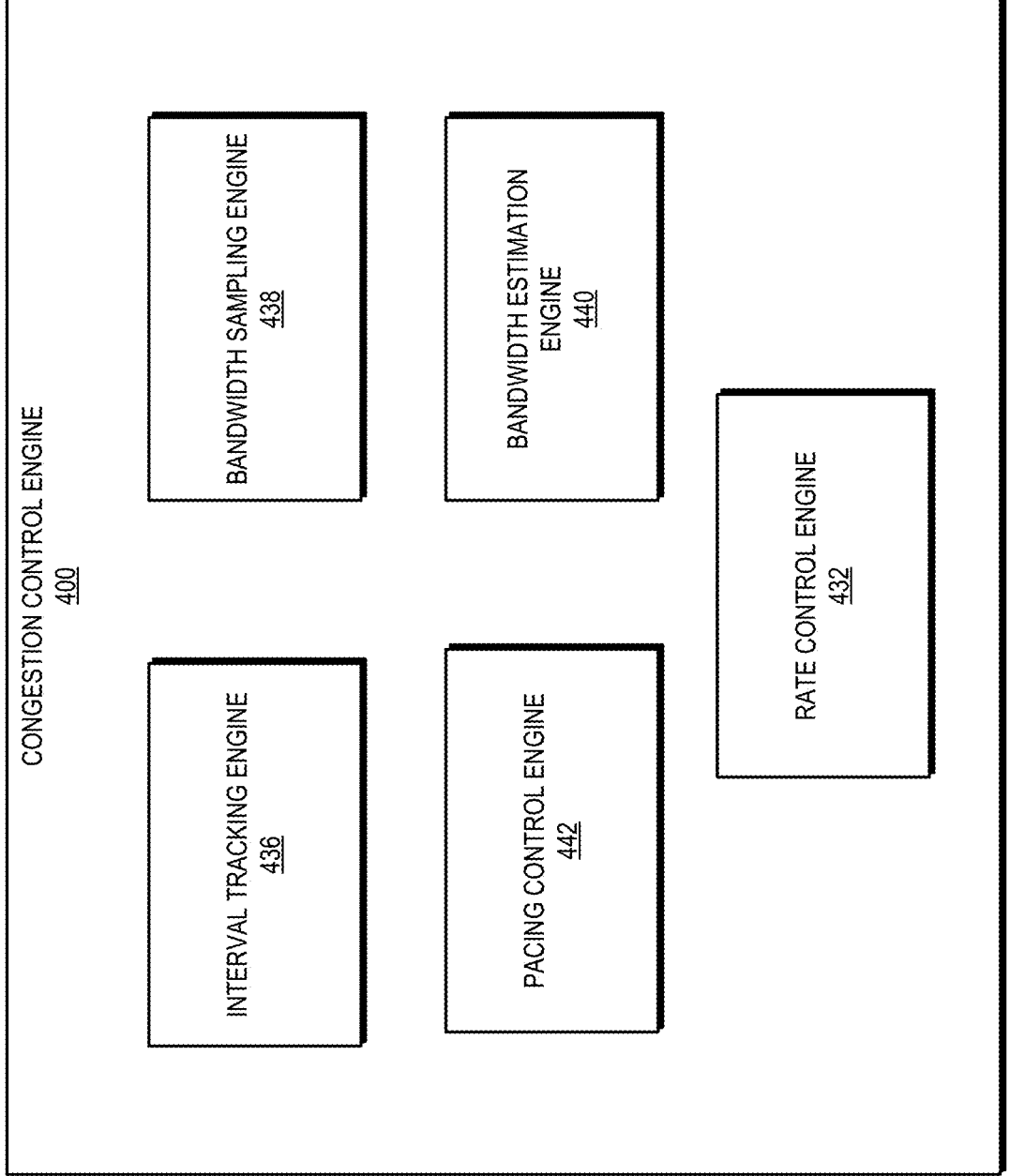
FIG. 4 is a block diagram of a congestion control engine configured to modify an encoding bitrate to alleviate network congestion, according to some embodiments.

Referring now to FIG. 4, a congestion control engine 400, similar to or the same as congestion control engine 124, 224, 324, configured to modify an encoder bitrate to alleviate network congestion is presented. Congestion control engine 400 includes interval tracking engine 436 that includes hardware and software configured to determine interval data for an encoded game frame (e.g., data representing the time interval needed to transmit an encoded frame) transmitted by a transport layer similar to or the same as transport layer 234, 334. Interval data for an encoded game frame includes, for example, the frame size of the encoded game frame, the time the encoded game frame was initially transmitted, and the time the frame was completely received by a respective client system 112. In embodiments, interval tracking engine 436 is configured to determine interval data for an encoded game frame based on frame data, similar to or the same as frame data 315, and timing data, similar to or the same as timing data 320. For example, interval tracking engine 436 is configured to determine interval data for an encoded game frame based on a frame size, a set of transmit timestamps, and a set of receive timestamps associated with the encoded game frame. As another example, interval tracking engine 436 is configured to determine a frame size based on frame data, the time the encoded game frame was initially transmitted based on the set of transmit timestamps, and the time the frame was completely received by a respective client system 112 based on the set of receive time stamps. In response to determining the interval data for an encoded game frame, interval tracking engine 436 is configured to provide the interval data to bandwidth sampling engine 438.

Bandwidth sampling engine 438 includes hardware and software configured to determine a bandwidth sample for the encoded game frame based on the interval data. For example, bandwidth sampling engine 438 is configured to determine the bandwidth sample based on the frame size of the encoded game frame, the time the encoded game frame was initially transmitted, and the time the frame was completely received by a respective client system 112 according to any equation disclosed herein. In response to determining the bandwidth sample, bandwidth sampling engine 438 is configured to provide the bandwidth sample to bandwidth estimation engine 440. Bandwidth estimation engine 440 includes hardware and software configured to update a current bandwidth estimate (e.g., predetermined default bandwidth estimate, previously determined bandwidth estimate) based on the bandwidth sample so as to produce an updated bandwidth estimate. For example, bandwidth estimation engine 440 updates a current bandwidth estimate based on a bandwidth sample determined by bandwidth sampling engine 438 and according to any equation disclosed herein to produce an updated bandwidth estimate. In response to producing an updated bandwidth estimate, bandwidth estimation engine 440 is configured to provide the updated bandwidth estimate to rate control engine 432 and pacing control engine 442.

Rate control engine 432, similar to or the same as rate control engine 232, 332, is configured to modify an encoding bitrate of an encoder, similar to or the same as encoder 106, 206, 306 based on a comparison of the updated bandwidth estimate and a current video bitrate. The current video bitrate, for example, represents the average rate at which a game stream 108 associated with an updated bandwidth estimate is transmitted by a transport layer to a respective client system 112. As an example, in response to an updated bandwidth estimate being greater than the current video bitrate (e.g., indicating an underutilization of network 110) rate control engine 432 is configured to increase the encoding bitrate of an encoder to produce an encoding bitrate. As another example, in response to an updated bandwidth estimate being less than the current video bitrate (e.g., indicating an overutilization of network 110), rate control engine 432 is configured to decrease the encoding bitrate of an encoder to produce an encoding bitrate. Congestion control engine 400 further includes pacing control engine 442 that includes hardware and software configured to set a pacing rate for a transport layer. The pacing rate represents, for example, the rate at which a set of packets for an encoded game frame are transmitted from a transport layer to a respective client system 112. In embodiments, pacing control engine 442 is configured to determine a pacing rate based on the updated bandwidth estimate produced by bandwidth estimation engine 440. For example, pacing control engine 442 determines a pacing rate as a multiple of the updated bandwidth estimate produced by bandwidth estimation engine 440.

Figure 5:
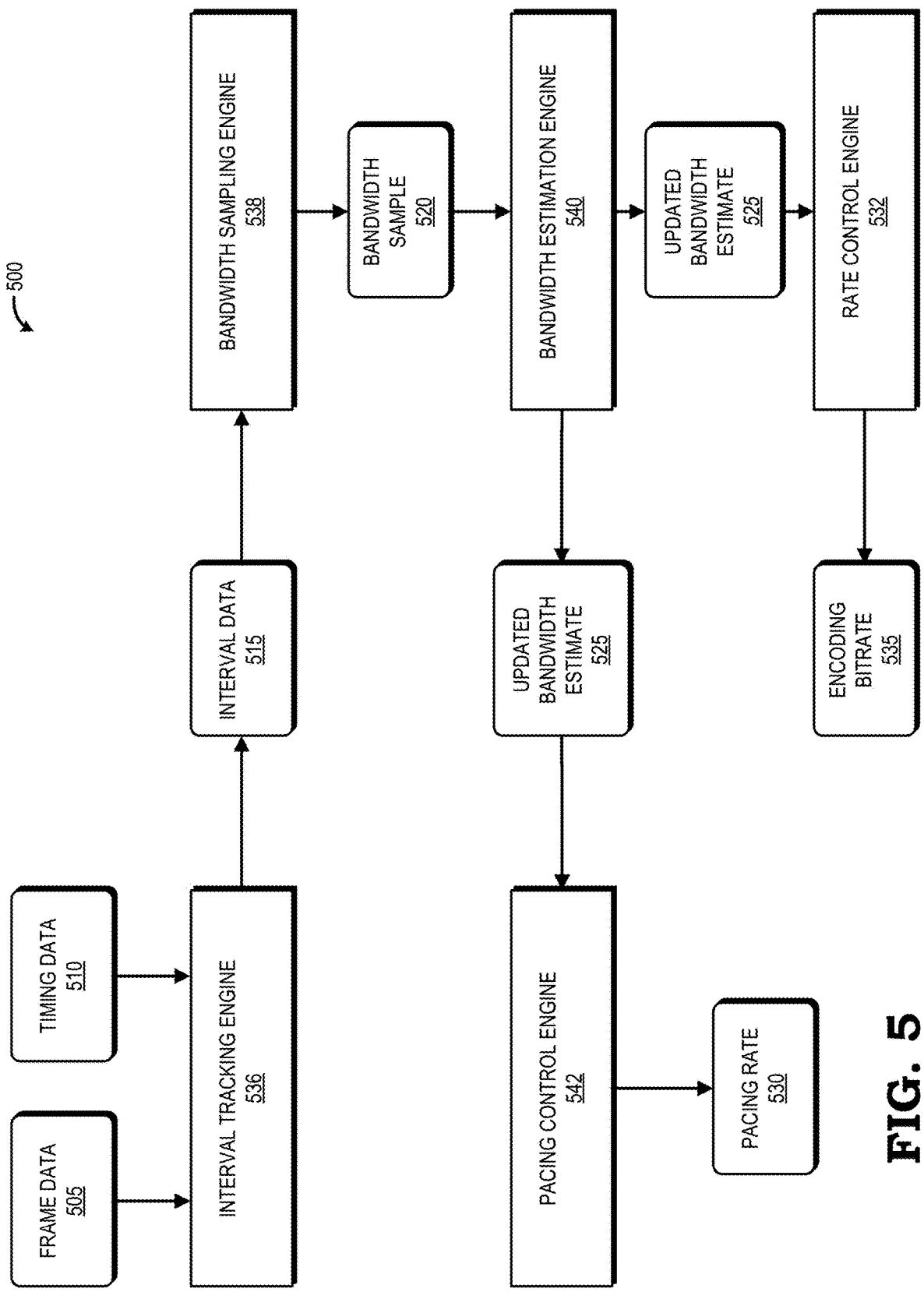
FIG. 5 is a flow diagram of an example operation for determining an updated bandwidth estimate, according to an example embodiment.

Referring now to FIG. 5, an example operation 500 determining an updated bandwidth estimate is presented. In embodiments, operation 500 includes interval tracking engine 536, similar to or the same as interval tracking engine 436, receiving frame data 505, similar to or the same as frame data 315, and timing data 510, similar to or the same as timing data 320. After receiving the frame data 505 and timing data 510, interval tracking engine 536 determines interval data 515 for an encoded game frame based on frame data 505 and timing data 510. Interval data 515 for an encoded game frame includes, for example, the frame size of the encoded game frame, the time the encoded game frame was initially transmitted, and the time the frame was completely received by a respective client system 112. As an example, interval tracking engine 536 determines interval data 515 for an encoded game frame based on a frame size from frame data 505, a set of transmit timestamps from timing data 510, and a set of receive timestamps from timing data 510. In response to determining interval data 515 for an encoded game frame, interval tracking engine 536 provides the interval data to bandwidth sampling engine 538, similar to or the same as bandwidth sampling engine 438. In response to receiving interval data 515, bandwidth sampling engine 538 determines bandwidth sample 520 based on interval data 515. For example, bandwidth sampling engine 538 determines bandwidth sample 520 based on the frame size of the encoded game frame, the time the encoded game frame was initially transmitted, and the time the frame was completely received by a respective client system 112 as indicated by interval data 515 according to any equation disclosed herein. After determining bandwidth sample 520, bandwidth sampling engine 538 provides bandwidth sample 520 to bandwidth estimation engine 540.

Bandwidth estimation engine 540, similar to or the same as bandwidth estimation engine 440, is configured to update a current bandwidth estimate (e.g., predetermined default bandwidth estimate, previously determined bandwidth estimate) based on bandwidth sample 520 so as to produce updated bandwidth estimate 525. For example, bandwidth estimation engine 540 updates a current bandwidth estimate based on bandwidth sample 520 according to any equation disclosed herein to produce updated bandwidth estimate 525. In response to producing updated bandwidth estimate 525, bandwidth estimation engine 540 is configured to provide updated bandwidth estimate 525 to rate control engine 532 and pacing control engine 542. In response to receiving updated bandwidth estimate 525, rate control engine 532, similar to or the same as rate control engine 232, 332, 432, modifies an encoding bitrate of an encoder, similar to or the same as encoder 106, 206, 306 based on a comparison of updated bandwidth estimate 525 and a current video bitrate so as to produce encoding bitrate 535, similar to or the same as encoding bitrate 335. As an example, in response to updated bandwidth estimate 525 being greater than the current video bitrate, rate control engine 532 increases the encoding bitrate of an encoder to produce encoding bitrate 535. As another example, in response to updated bandwidth estimate 525 being less than the current video bitrate, rate control engine 532 decreases the encoding bitrate of an encoder to produce encoding bitrate 535.

According to embodiments, the operation 500 further includes pacing control engine 542, similar to or the same as pacing engine 442 determining pacing rate 530 for a transport layer. Pacing rate 530 represents, for example, the rate at which a set of packets for an encoded game frame are transmitted from a transport layer to a respective client system 112. In embodiments, pacing control engine 542 determines pacing rate 530 based on updated bandwidth estimate 525. For example, pacing control engine 542 determines pacing rate 530 as a multiple of updated bandwidth estimate 525.

Figure 6:
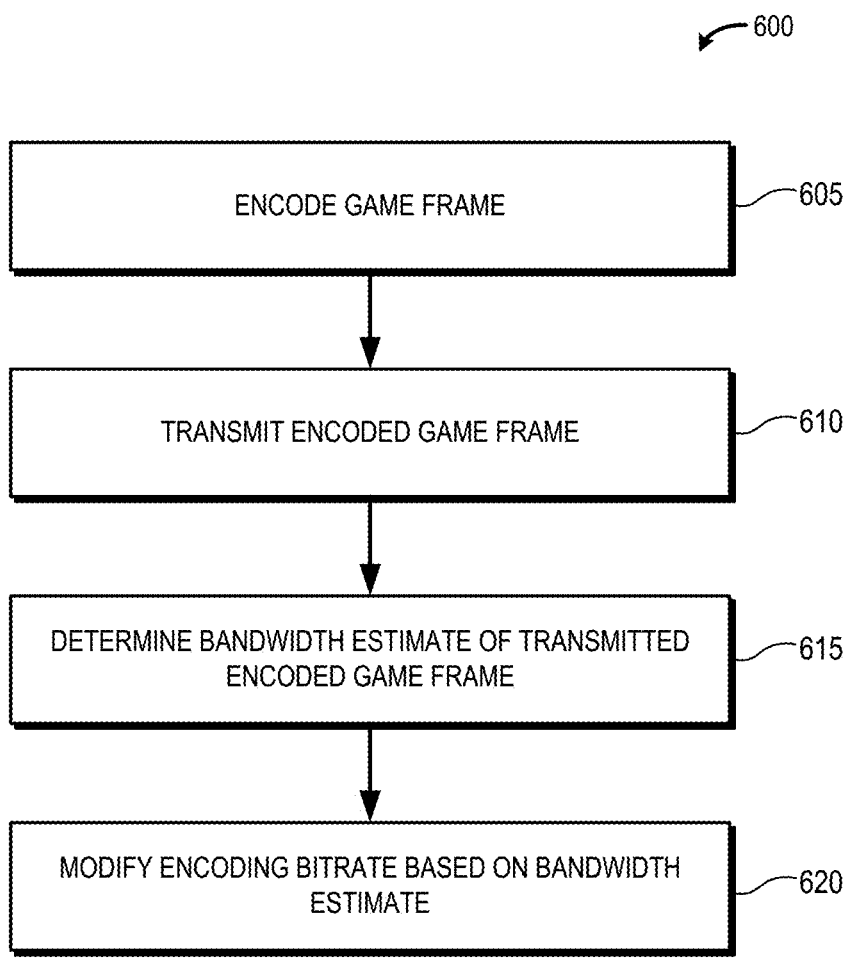
FIG. 6 is a flow diagram of an example method for modifying an encoding bitrate to alleviate network congestion, according to an example embodiment.

Referring now to FIG. 6, an example method 600 for modifying an encoding bitrate to alleviate network congestion is presented. At step 605, an encoder, similar to or the same as encoder 106, 206, 306, encodes a game frame to produce an encoded game frame. At step 610, a transport layer, similar to or the same as transport layer 234, 334, transmits the encoded game frame as a set of packets to a respective client system 112 via the network 110. Additionally, at step 610, the transport layer determines a set of transmit timestamps associated with the set of packets transmitted to the respective client system 112 and receives a set of receive timestamps associated with the set of packets received by the respective client system 112 from the transport layer. At step 615, a congestion control engine, similar to congestion control engine 124, 224, 324, 400, determines a bandwidth estimate (e.g., bandwidth sample, updated bandwidth estimate) based on the size of the transmitted encoded game frame and timing data associated with the transmitted set of packets of the encoded game frame. Such timing data includes, for example, the set of transmit time stamps and the set of receive time stamps. As an example, the congestion control engine determines a bandwidth sample for the transmitted encoded game frame based on the frame size of the encoded game frame, the set of transmit timestamps, and the set of receive timestamps according to any equations disclosed herein. As another example, the congestion control engine determines an updated bandwidth estimate based on a determined bandwidth sample according to any equations disclosed herein.

At step 620, a rate control engine, similar to rate control engine 232, 332, 432, 532, modifies an encoding bitrate of the encoder based on the bandwidth estimate (e.g., bandwidth sample, updated bandwidth estimate). For example, the rate control engine modifies an encoding bitrate of the encoder based on a comparison of the bandwidth estimate to a current video bitrate that, for example, represents the average rate at which a game stream 108 associated with the bandwidth estimate is transmitted by the transport layer to a respective client system 112. In response to the bandwidth estimate being less than the current video bitrate, the rate control engine decreases the encoding bitrate of the encoder. In response to the bandwidth estimate being greater than the current video bitrate, the rate control engine increases the encoding bitrate of the encoder. Modifying the bitrate of the encoder in this way helps alleviate congestion on the network 110 transmitting a game stream 108 while also helping to prevent underutilization of network 110.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   based on encoding a frame according to an encoding bitrate to produce an encoded frame, transmitting the encoded frame as a set of packets over a network;
   determining a bandwidth estimate based on timing data associated with transmitting the set of packets over the network and based on an undershoot correction factor associated with a size of the encoded frame; and
   modifying the encoding bitrate based on the bandwidth estimate.

2. The method of claim 1, wherein the timing data comprises a first set of time stamps indicating when the set of packets was transmitted and a second set of time stamps indicating when the set of packets was received by a device.

3. The method of claim 1, wherein modifying the encoding bitrate comprises:
   based on the bandwidth estimate being less than a current video bitrate, decreasing the encoding bitrate.

4. The method of claim 1, wherein modifying the encoding bitrate comprises:

based on the bandwidth estimate being greater than a current video bitrate, increasing the encoding bitrate.

5. The method of claim 1, wherein determining the bandwidth estimate comprises:

determining a time interval to transmit the encoded frame based on the timing data, wherein the bandwidth estimate is determined based on the time interval.

6. The method of claim 1, wherein determining the bandwidth estimate comprises:

modifying the bandwidth estimate based on a predetermined step size.

7. The method of claim 1, further comprising:

based on encoding a second frame to produce a second encoded frame, transmitting the second encoded frame as a second set of packets over the network according to a pacing rate based on the bandwidth estimate.

8. A computing device, comprising:

an encoder configured to encode a frame according to an encoding bitrate to produce an encoded frame; and a processor configured to:

transmit the encoded frame as a set of packets over a network;

determine a bandwidth estimate based on timing data associated with transmitting the set of packets over the network and based on an undershoot correction factor associated with a size of the encoded frame; and modify the encoding bitrate based on the bandwidth estimate.

9. The computing device of claim 8, wherein the timing data comprises a first set of time stamps indicating when the set of packets was transmitted and a second set of time stamps indicating when the set of packets was received by a device.

10. The computing device of claim 8, wherein the processor is configured to:

based on the bandwidth estimate being lower than a current video bitrate, decrease the encoding bitrate.

11. The computing device of claim 8, wherein the processor is configured to:

based on the bandwidth estimate being greater than a current video bitrate, increase the encoding bitrate.

12. The computing device of claim 8, wherein the processor is configured to:

determine a time interval to transmit the encoded frame based on the timing data, wherein the bandwidth estimate is determined based on the time interval.

13. The computing device of claim 8, wherein the processor is configured to:

modify the bandwidth estimate based on a predetermined step size.

14. The computing device of claim 8, wherein the processor is configured to:

based on the encoder encoding a second frame to produce a second encoded frame, transmit the second encoded frame as a second set of packets over the network according to a pacing rate based on the bandwidth estimate.

15. A non-transitory computer-readable storage medium including instructions that, when executed by at least one processor of a computing device, cause the at least one processor to:

encode a frame according to an encoding bitrate to produce an encoded frame;

transmit the encoded frame as a set of packets over a network;

determine a bandwidth estimate based on timing data associated with transmitting the set of packets over the network and based on an undershoot correction factor associated with a size of the encoded frame; and modify the encoding bitrate based on the bandwidth estimate.

16. The non-transitory computer-readable storage medium of claim 15, wherein the timing data comprises a first set of time stamps indicating when the set of packets was transmitted and a second set of time stamps indicating when the set of packets was received by a device.

17. The non-transitory computer-readable storage medium of claim 15 further including instructions that cause the at least one processor to:

based on the bandwidth estimate being lower than a current video bitrate, decrease the encoding bitrate.

18. The non-transitory computer-readable storage medium of claim 15 further including instructions that cause the at least one processor to:

based on the bandwidth estimate being greater than a current video bitrate, increase the encoding bitrate.

19. The non-transitory computer-readable storage medium of claim 15 further including instructions that cause the at least one processor to:

modify the bandwidth estimate based on a predetermined step size.

20. The non-transitory computer-readable storage medium of claim 15 further including instructions that cause the at least one processor to:

based on encoding a second frame to produce a second encoded frame, transmit the second encoded frame as a second set of packets over the network according to a pacing rate based on the bandwidth estimate.

* * * * *